Feb. 11, 1941.　　　A. M. STARR　　　2,231,172
INTERNAL COMBUSTION ENGINE
Filed Oct. 31, 1938　　　2 Sheets-Sheet 1

INVENTOR.
ALLAN M. STARR
BY
ATTORNEY.

Feb. 11, 1941.  A. M. STARR  2,231,172
INTERNAL COMBUSTION ENGINE
Filed Oct. 31, 1938  2 Sheets-Sheet 2
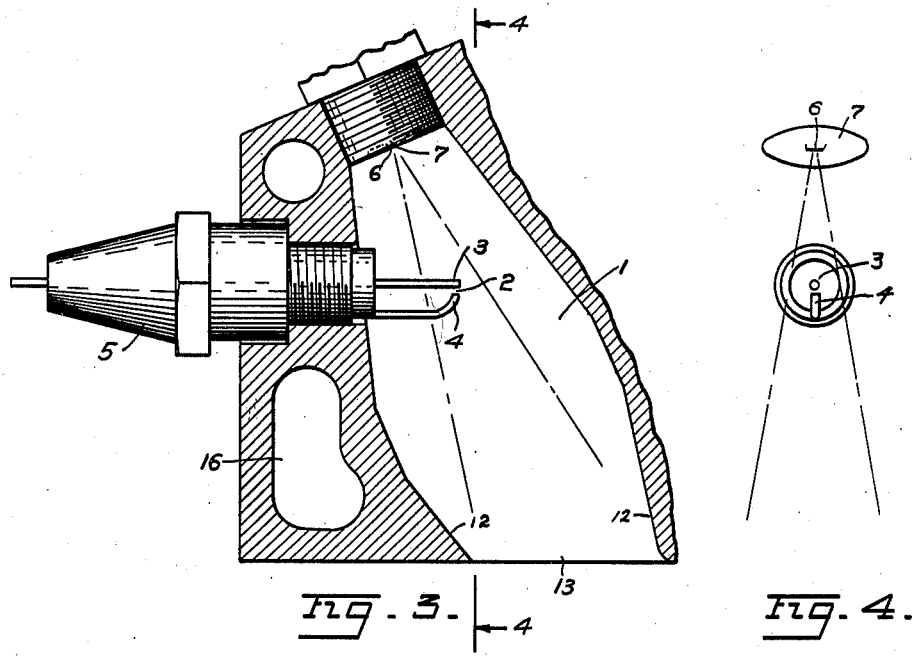
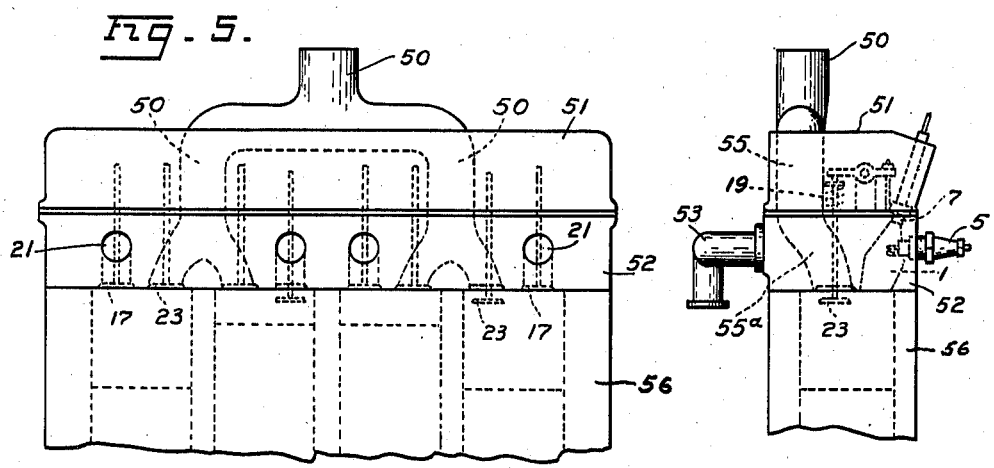
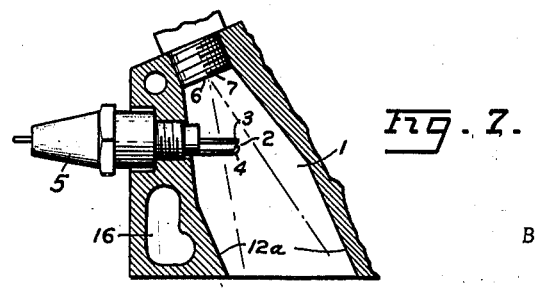
INVENTOR.
ALLAN M. STARR
BY
ATTORNEY.

UNITED STATES PATENT OFFICE 2,231,172

INTERNAL COMBUSTION ENGINE

Allan M. Starr, Piedmont, Calif., assignor to Starr & Sweetland, San Francisco, Calif., a co-partnership composed of Ernest J. Sweetland and Allan M. Starr Application October 31, 1938, Serial No. 237,925

3 Claims. (Cl. 123—32)

This invention relates to internal combustion engines and has particular reference to the type of engine which receives its fuel in the combustion chamber injected in an atomized state during the compression stroke, and which utilizes an electric spark for ignition.

More specifically my invention consists of a combustion system employing a combustion chamber, spark plug, fuel injecting nozzle, and fuel pump in such a manner that there is sufficient stratification of the fuel charges injected into the combustion chamber to provide an air-fuel mixture ratio which is readily ignitable by an electric spark and efficiently combustible throughout a wide range of engine loads and speeds.

An object of my invention is to provide a combustion system wherein hot residual exhaust gas aided by the heat of compression renders part of the fuel to encounter the ignition spark in a gaseous phase regardless of engine load or operating temperature.

Another object is to provide a combustion system wherein sufficient quiescence is attained in a portion of the combustion chamber to provide suitable conditions for the igniting and burning of small fuel charges; and in the same combustion chamber, but in a portion more remote from the fuel nozzle and spark gap, sufficient turbulence is attained at the proper time to cause efficient burning of full load fuel charges.

Another object is to provide an internal combustion engine with the advantages of timed spark ignition, capable of efficiently burning fuel of comparatively low volatility throughout a considerable range of engine loads and speeds without resorting to the high cylinder pressure necessarily employed by Diesel engines.

Another object is to provide an internal combustion engine with a combustion chamber having a multiple orifice fuel injector and a spark gap located between the axes of a plurality of orifices so that flame propagation commences between the fuel jets and propagates outwardly.

Another object of my invention is to provide a cylinder head construction whereby the intake air enters the engine at the top of the cylinder head and passes directly down through the cylinder head into the engine cylinders without ever passing in close proximity to the hot exhaust system. With this construction the incoming air receives a minimum of heat while entering the engine which is beneficial in avoiding detonation and increasing available power.

The invention possesses other advantageous features, some of which, with the foregoing, will be set forth at length in the following description where that form of the invention which has been selected for illustration in the drawings accompanying and forming a part of the present specification is outlined in full. In said drawings one form of the invention is shown, but it is to be understood that it is not limited to such form since the invention as set forth in the claims may be embodied in a number of forms.

Referring to the accompanying drawings:

Figure 3 shows a sectional elevation of the combustion chamber with a four jet fuel spray, the broken lines representing the axes of two of the nozzle orifices.

Figure 4 shows a diagrammatic elevation of the four jet fuel spray and spark plug along line 4—4 of Fig. 3, the broken lines being the axes of the nozzle orifices.

Fig. 5 is a side elevation showing the intake air system and the manner in which the cylinder head and valve rocker cover plate are assembled with their respective conduits in alignment.

Figure 6 is an end elevation of Fig. 5.

Figure 7 shows a modified form of combustion chamber which is of reduced cross-sectional area at the end most remote from the cylinder and having walls that are substantially parallel in the lower portion thereof.

Figure 1:
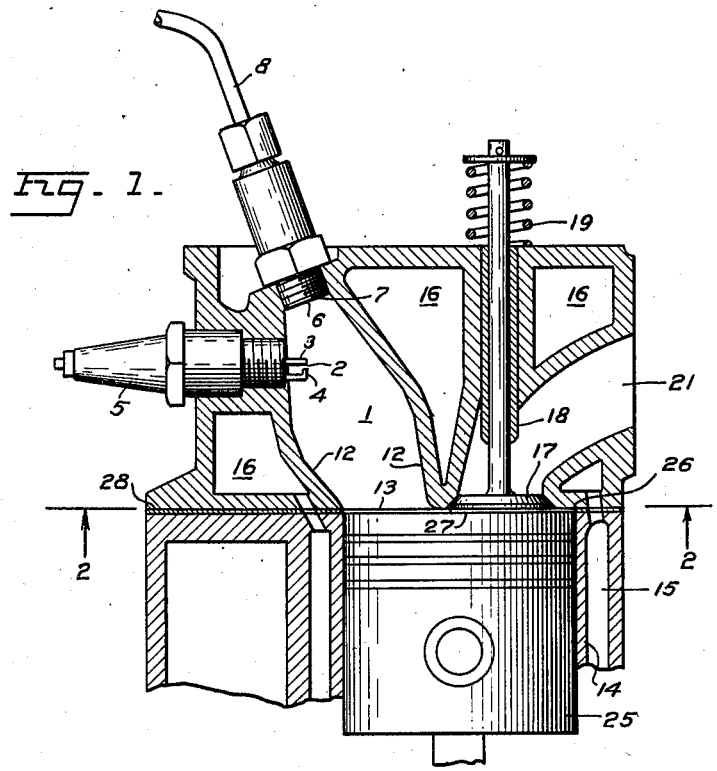
Figure 1 shows a sectional elevation of my cylinder head construction taken on the line 1—1 of Fig. 2.

Referring to the drawings in detail, the numeral 1 designates the combustion chamber wherein the spark gap 2 is formed between points 3 and 4 which form a part of the spark plug 5. Directed into the combustion chamber is the fuel nozzle 7. This nozzle contains a spring loaded valve, normally held closed, and properly proportioned atomizing and directioning orifice or orifices 6. As fuel nozzles with spring loaded valves are in general use it is not deemed necessary to illustrate the details of the nozzle valve in the present instance. Fuel is fed to the nozzle at a proper time and rate from a metering pump through the pipe 8, or by any other suitable means.

If the fuel nozzle has a single orifice or an orifice with a pin or pintle in the center the spark points are positioned as shown in Fig. 1 on one side of the fuel spray. That is, the points of the spark plug do not extend out into the dense portion of the fuel jet or spray but only extend far enough to position the spark gap in the fringe of the fuel spray.

When a multi-hole nozzle is used which produces a fuel spray in several jets as shown in Fig. 3 and Fig. 4 the spark points may extend out to the combustion chamber axis as shown in Fig. 3 and Fig. 4. The spark gap is then substantially equi-distant to each fuel jet and also in the fringe of each fuel jet. The fuel jets and the spark wires are so positioned that no fuel jet impinges directly on either spark wire. As shown by Fig. 3 and Fig. 4 a four jet spray is positioned so that the two jets on the spark plug side of the combustion chamber straddle the two spark wires, the grounded spark wire being preferably located beneath the center or insulated spark wire.

The chamber 1, Fig. 1, is preferably of frusto-conical form in its upper portion. 13 is the opening from the combustion chamber into the engine cylinder. The walls of the construction shown at 12 diverge from the opening 13 to provide a maximum cross-sectional area near the lower end of the combustion chamber. I have found this to be a satisfactory volume distribution for the combustion chamber whereby sufficient compression space is contained in the chamber without resorting to excessive length.

Numeral 14, Fig. 1, represents the cylinder wall which is surrounded by water jacket 15, the cylinder head, valve ports, valve seats, combustion chamber etc. being cooled by circulation of water through the jacket 16. 17 represents the inlet valve which is guided by bushing 18 and is seated by spring 19, the inlet air entering through passage 21 which connects with an inlet manifold (not shown).

The engine piston 25 is shown at the top of its stroke, its upper face 27 being very nearly flush with the top face of the engine cylinder block. The space which lies within the cylinder and between the piston face 27 and the lower side of the cylinder head 26 and the valve heads, herein referred to as the compression chamber, is such that upon movement of the piston to the end of its compression stroke substantially the entire volumetric content of the compression chamber is displaced into the combustion chamber 1 with the exception of the contents of the very small space having about the thickness of the gasket 28 lying between the piston face 27 and the lower side of the cylinder head 26 and the valve heads when the piston is in the position described.

Figure 2:
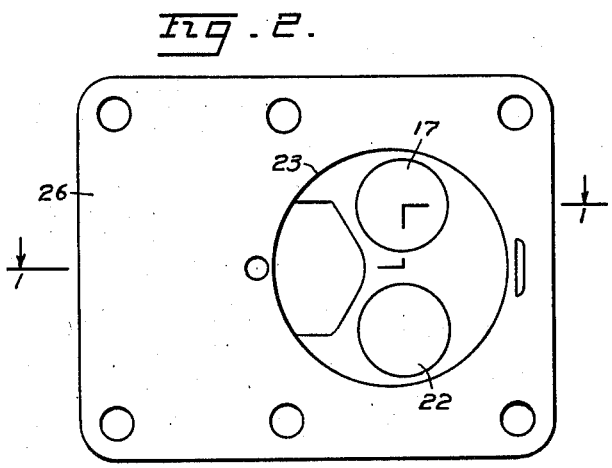
Figure 2 is an inverted plan view taken on the line 2—2 of Fig. 1.

Referring to Fig. 2, the position of the combustion chamber mouth 13, inlet valve 17, and exhaust valve 22, are clearly shown. The circle 23 represents the outline of the engine cylinder wall when the head is in position.

In the operation of this engine, I may use any well known type of fuel injector or pump to deliver the required quantities of fuel at the desired time and rate through pipe 8 and the principles herein set forth may be carried out with any number of cylinders as will be understood by those skilled in the art.

The spark plug 5 may be connected either to magneto or spark coil by any well known systems in common use and it is within the province of my invention to utilize any of the well known methods of regulating the timing of ignition and injection. The spark is preferably timed to start from 15 to 30 degrees before top center position depending on engine speed, and fuel injection timed to start during the latter half of the compression stroke, and injection may continue for about 30 degrees of crank travel at full load. At lighter loads the start of injection is retarded but the cut off of injection preferably occurs at approximately the same piston position as for full load. Fuel pumps with this metering characteristic are well known to those skilled in the art.

Referring to Figures 5 and 6, which show one form of cylinder head with cover plate, the numeral 50 designates the air intake manifold, the main body of which is cast integral with the cover 51 which is secured to the cylinder head 52 by any suitable means. It will be noted that when the cover plate 51 and cylinder head 52 are secured together the air intake conduits in the respective parts register to form the completed air intake manifold. While I have shown the upper portion of the intake manifold cast integral with the cover plate, it may be cast separately if desired. It may be integral with the cylinder head or made in a separate unit.

Figure 6 shows the relative positions of the intake manifold 50, the combustion chamber 1, spark plug 5, injector nozzle 7, valve spring 19, exhaust manifold 53 and cylinder block 56. With this construction the intake air is brought into the engine cylinder through a downwardly leading intake passage in the cylinder head, as shown at 55 and 55a, the intake manifold being cast integrally with the cover plate which conceals the rocker arms, valve springs, etc. The exhaust manifold 53 is secured to the side of the cylinder head in the usual manner. This construction, it will be noted, not only avoids unnecessary curves in the intake manifold but provides a system for getting air into the engine cylinders without the entering air temperature being materially increased by high exhaust manifold temperature.

In the modification illustrated in Fig. 7 the combustion chamber is elongated in form having a quiescent zone in the upper portion thereof adjacent the injector nozzle. I may employ this form of combustion chamber with single aperture nozzle or with the multi-hole nozzle illustrated in Figs. 3 and 4. Regardless of which form of injector nozzle or combustion chamber is used, it is always of importance to so design the engine that substantially all of the air is forced out of the cylinder space into the combustion chamber at the top of the compression stroke. This is done not only because it is desirable to have as much of the air as possible compressed into the combustion chamber where it can be mixed with fuel and thus utilized to support combustion, but because when the piston approaches its uppermost limit most of the air which is then being forced into the combustion chamber approaches the chamber at a high velocity in a lateral direction from the narrow space between the piston and the lower face of the cylinder head. The result of thus violently squeezing the last of the air into the combustion chamber in a lateral direction is to produce turbulence in the lower portion of the combustion chamber at the end of the compression stroke and thus improve combustion.

The operation of the engine is as follows:

The piston 25 goes down while inlet valve 17 is open and air is drawn into the cylinder through port 21. The contents of the combustion chamber 1 is not disturbed during this cycle, the air entering downwardly and filling only the actual swept volume of the cylinder into which it is directed by the valve 17. The inlet valve 17 closes as the piston starts upward on its compression stroke. The cylinder is now filled with air and the combustion chamber 1 is filled with residual exhaust gas from a previous cycle. As the piston moves up the contents of both cylinder and combustion chamber 1 are compressed, the air in the cylinder passing through mouth 13 into the lower part of chamber 1, the residual exhaust gas remaining stratified above the incoming air as it is compressed. Toward the end of the compression stroke fuel is injected from orifice 6 through the hot residual gas now compressed into the space directly in front of the nozzle. The fuel thus injected is heated by the strata of hot gas in the upper end of the chamber. When the spark occurs at gap 2, some of the more volatile fractions of the fuel injected through the hot strata have gasified in this region and mixed with the proper amount of air to render the passing of the spark effective in producing ignition. As the piston completes the very last portion of its compression stroke, ignition is rapidly developing into burning in the upper strata of comparatively undisturbed gas mixture in chamber 1, and the air in the upper end of the cylinder directly under the valve heads 17 and 22 is violently squeezed toward and into mouth 13. At the end of the compression stroke the piston top comes to within about $\frac{1}{16}$ inch of the valve heads and surface forming the end of the cylinder. The squeezing of the last air to be forced from the cylinder into the chamber 1 then causes a violent disturbance which produces a turbulent state in the lower part of the chamber 1, and injected fuel that has penetrated to the air in this lower and more voluminous part of chamber 1 is then thoroughly mixed with the air by this turbulence, consequently complete efficient combustion of the fuel and air in the chamber is attained at full load. The high degree of turbulence at the top of the stroke does not disturb the stratification nor interfere with the ignition of spark-ignitable gases at gap 2 because the turbulence is set up in the lower and more spacious part of the chamber after the condition for ignition has been established and ignition has occurred.

At lighter loads the smaller fuel quantities penetrate less air in the chamber and these charges burn stratified in the upper and less turbulent region of chamber 1 making it possible to very efficiently govern this engine down to very light loads by reducing the fuel delivery of the pump—the intake air charges remaining constant.

The fuel injecting system of the engine is depended upon to deliver the fuel charges into the combustion chamber in such a way that combustible air-fuel ratios are attained throughout the load and speed range of the engine, and the stratification of the charge at various engine loads is accomplished by correlating proper fuel injection characteristics with my combustion chamber arrangement. At very light loads fuel injection duration is very short and the fuel injection occurs substantially simultaneously with the ignition spark. As the fuel quantity injected increases the start of injection is advanced and so the crank angle during which fuel is injected is increased. The fuel nozzle must have properly proportioned fuel delivery orifice or orifices so that at very light load the injected fuel is finely atomized and penetrates no further than the region in the combustion chamber about the spark points; and at full load the fuel must be given sufficient penetration to reach the very lower end of the chamber where the air comes in to mix with the fuel.

The expansion stroke and exhaust stroke of this engine occur in the usual manner, valve 22 opening and allowing the contents of the cylinder to be swept out by the up stroke of the piston, and all the residual exhaust gas left in storage in chamber 1 remains to be later utilized to prepare the next fuel charge for ignition when on its way to meet the next air charge.

Under certain conditions I find it particularly advantageous to use the multi-hole nozzle as illustrated in Figures 3 and 4. When this arrangement is employed, the size of the nozzle openings and the angle included between the axes thereof are correlated with the size and shape of the combustion chamber. As shown by Figures 3 and 4, the ignition spark gap is located approximately on the combustion chamber axis where it is in the fringe of each fuel jet. I have found that by this arrangement ignition takes place satisfactorily regardless of the load and speed of the engine. As previously indicated the injector nozzle is so positioned that the wires 3 and 4 are located between the jets and not directly in the paths thereof.

My engine is not limited to any particular compression ratios because it is independent of compression as a means of ignition. I am therefore able to operate this engine at the most desirable range of compression ratios from all standpoints; namely, from about 5 to 1 to 10 to 1. At these ratios good efficiency is attainable and operating pressures are low enough to assure a reasonable life for bearings, pistons, and piston rings. Also the low operating pressures make possible the use of light reciprocating parts in this engine, so that high operating speeds are possible with accompanying high specific output.

It is beneficial to the operation of my engine to allow the intake air to enter the cylinder at as low a temperature as possible when operating at full load; but, when operating at light loads, there are some benefits derived from heating the incoming air. It is within the province of my invention to incorporate any well known air heater to raise the intake air temperature when the engine is not operating at full load, and automatic regulation means may be used to vary the temperature in accordance with the load.

I claim:

1. The method of operating an engine comprising, trapping a quantity of residual gas in a combustion chamber; compressing a major portion of a charge of air in said combustion chamber without imparting substantial turbulence to said residual gas, injecting fuel into said combustion chamber through the quiescent residual gas while said air is being compressed; igniting the relatively quiescent mixture of air and fuel and then imparting turbulence to the ignited mixture near the end of the compression stroke.

2. The method of operating an engine comprising, trapping a quantity of residual gas in a combustion chamber; creating a quiescent zone of residual gas in the upper end of said combustion chamber by compressing the major portion of an air charge in said combustion chamber without imparting substantial turbulence to said residual gas; injecting fuel into said combustion chamber through said quiescent zone while said air is being compressed; igniting the relatively quiescent mixture of air and fuel; and then imparting turbulence to the ignited mixture by rapidly introducing the remainder of said air charge into said combustion chamber at a high velocity.

3. The method of operating an engine comprising, trapping a quantity of residual gas in a combustion chamber; compressing a major portion of a charge of air in said combustion chamber without imparting substantial turbulence to said residual gas, thereby creating a quiescent zone of substantially residual gas in the upper end of said combustion chamber; starting the injection of fuel into said combustion chamber through said quiescent zone during the latter half of the compression stroke; starting the ignition of the relatively quiescent mixture of air and fuel during from approximately 30 to 15° of the crank travel before the end of said compression stroke; and then imparting turbulence to the ignited mixture at substantially the end of said compression stroke.

ALLAN M. STARR.